United States Patent [19]

Dunne, Jr.

[11] 4,161,879
[45] Jul. 24, 1979

[54] COMPOSITE TANGENTIAL AND AXIAL EXHAUST FLUID FLOWMETER

[75] Inventor: Carroll J. Dunne, Jr., Toledo, Ohio

[73] Assignee: Chrysler Corporation, Highland Park, Mich.

[21] Appl. No.: 892,616

[22] Filed: Apr. 3, 1978

[51] Int. Cl.² .............................................. G01F 1/06
[52] U.S. Cl. ....................................................... 73/229
[58] Field of Search ................................. 73/202, 229

[56] References Cited

U.S. PATENT DOCUMENTS

| 3,256,736 | 6/1966 | Lee et al. | 73/229 |
| 3,329,021 | 7/1967 | Quesinberry | 73/229 |
| 3,721,505 | 3/1973 | Garnett | 415/53 |
| 4,047,433 | 9/1977 | Danbanian | 73/229 |

Primary Examiner—Herbert Goldstein
Attorney, Agent, or Firm—Baldwin & Newtson

[57] ABSTRACT

A composite tangential and axial exhaust fluid flowmeter featuring both tangential and balanced, bidirectional axial exhaust outlets cooperating with a common tangential inlet to a fluid chamber, which encloses a minimum mass of fluid and has an escalloped peripheral wall surrounding a light weight, low mass multi-toothed rotor freely rotatably mounted in the fluid chamber.

28 Claims, 11 Drawing Figures

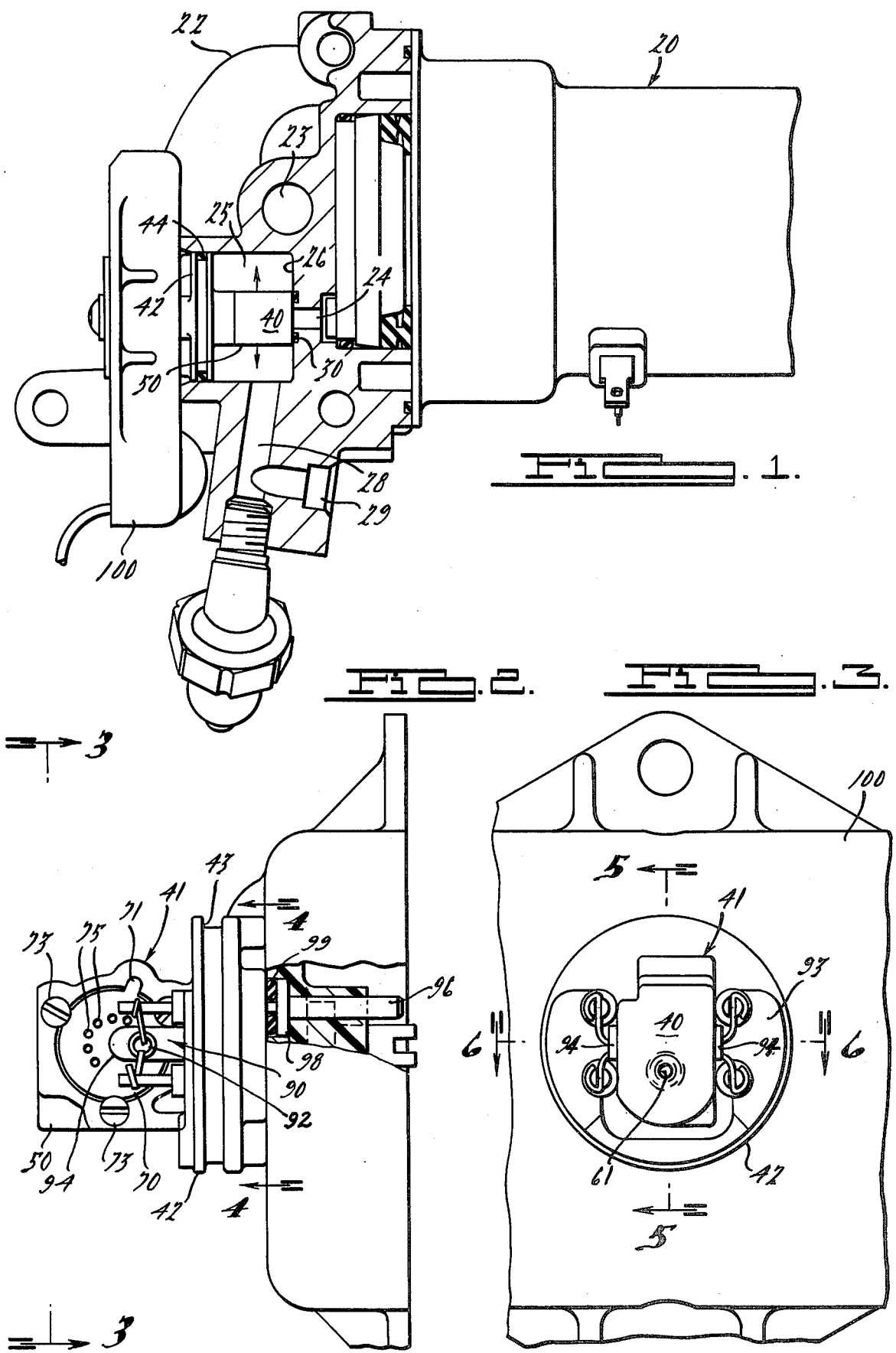

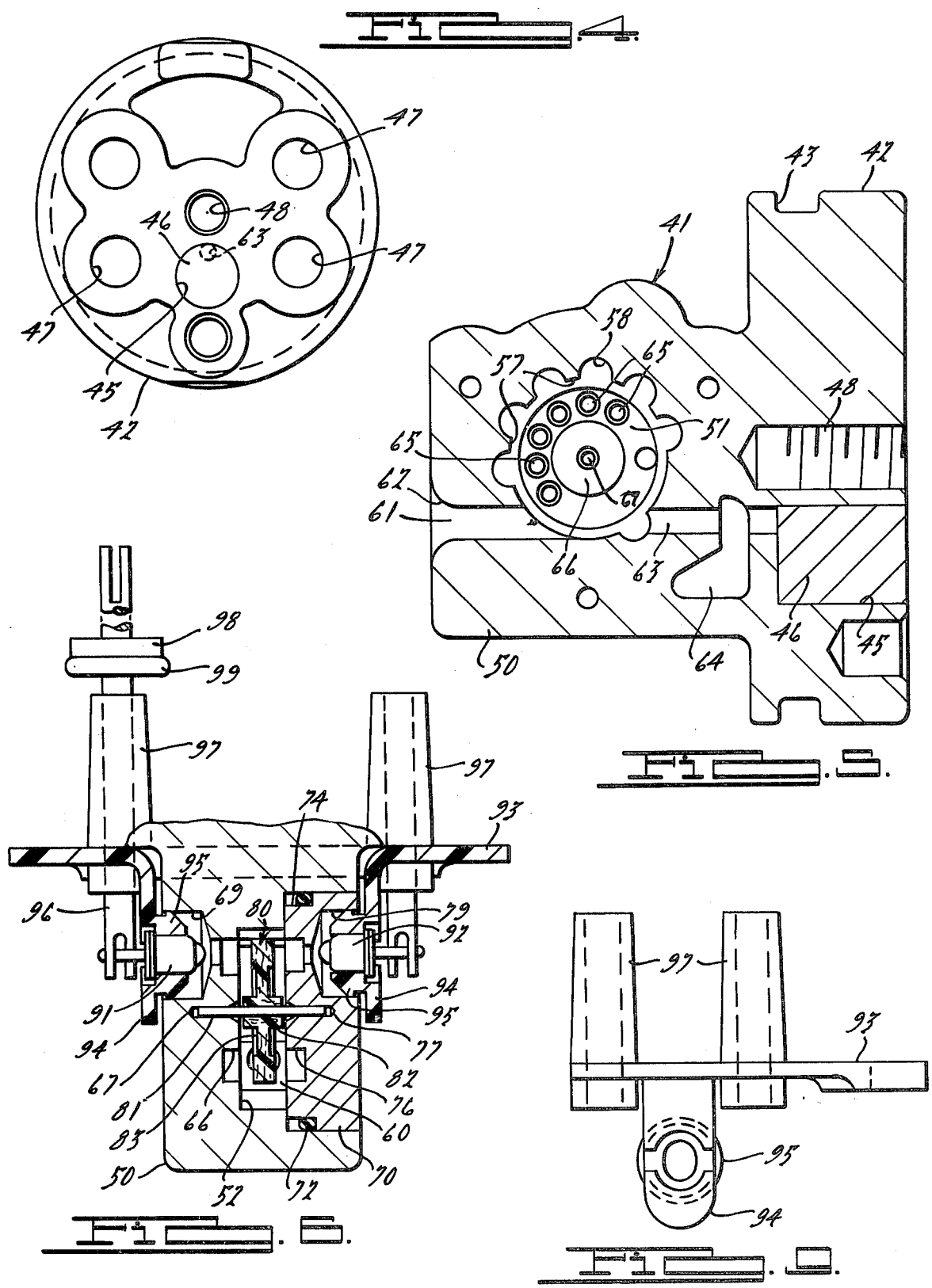

Flow Rate: lbs/hr

COMPOSITE TANGENTIAL AND AXIAL EXHAUST FLUID FLOWMETER

BACKGROUND OF THE INVENTION

This invention relates to fluid flowmeters, and, more particularly, to an improved fluid flowmeter transducer device specially suited for use in engine fuel consumption and/or management systems for combustion powered engines.

An example of a fuel metering system in which the herein described flowmeters may be employed is illustrated by U.S. Pat. No. 4,048,964, which requires a fuel flowmeter transducer device developing a pulsatory electrical signal whose pulse repetition rate varies linearly in accordance with the flow rate of fuel supplied to the engine. Air supplied to the engine is sensed by a swirl-type air flowmeter whose pulsatory electrical signal output is processed together with the fuel signal pulses from the fuel flowmeter by a mass fuel/air ratio scheduled electronic controller, which controls a fuel metering or supply device to supply fuel to the engine precisely in accordance with the scheduled fuel/air ratio.

The abovementioned fuel metering system is intended to meet stringent engine emission and fuel economy mandates for production vehicles and requires, for its successful implementation, precise and reliable instruments possessed of a high degree of accuracy and linearity over the entire range of engine performance and vehicle operating conditions. In addition to a low pressure drop, the fuel flowmeter or flow transducer device should produce a high pulse count output at low fuel flow rates, as during engine idle conditions, and should also exhibit a fast response to fluid flow rate changes as well as a rapid run-down or braking characteristic when the fluid flow therethrough has been decreased, as during vehicle deceleration conditions. Consistent and optimum performance and repeatability of results between production flowmeters are also necessary criteria.

Known forms of prior art flowmeters, as exemplified by U.S. Pat. Nos. 3,329,021; 3,867,840; and 4,047,433, for example, fall short of meeting the foregoing requirements.

The present invention thus seeks generally and has among its objects to provide a fuel flowmeter transducer device possessed of the above enumerated and other desirable characteristics and which is of compact size, composed of a minimum number of parts and is of simple and inexpensive construction suited to high volume production fabrication.

SUMMARY OF THE INVENTION

According to the present invention there is provided a relatively small and compact fluid flowmeter whose output is linearized by combining the characteristics of both tangential and axial type flowmeters. The composite flowmeter features separate tangential and balanced, bidirectional axial exhaust outlets cooperating with a common tangential inlet to an enclosed fluid chamber, which is of minimum volumetric capacity and encloses a minimum mass of rotating fluid. The fluid chamber has an escalloped peripheral wall surrounding a light weight, low mass multi-toothed rotor, which is freely rotatably mounted in the fluid chamber on a self-centering spindle providing a line contact and low frictional coefficient engagement along the full axial width of the rotor hub closely fitting thereon.

The rotational rate of the rotor is sensed by a photoelectric optical transducer system, which produces a pulse count for each rotor tooth passing thereby and is supported in a pressed-in, integral insulative mounting and connector clip, which is readily mountable to and accessible from the exterior of the meter housing without disassembly of the flowmeter.

The meter housing is readily attachable to and pluggably receivable as a stopper in the cylindrical bore of an outlet chamber cavity in the fuel pump housing into which fluid is exhausted from the plurality of flowmeter outlet ports. The flow-meter body carries on the outer side of the stopper portion thereof an attachable or housing for electronic circuitry for the photoelectric transducer system, which is connected to the electronic circuitry through connector pins carried in the mounting for the photoelectric transducer elements.

The foregoing and other objects, features and advantages of the several aspects of the invention will be more fully understood from the detailed description following and made with reference to the accompanying drawings.

DESCRIPTION OF THE DRAWINGS

FIG. 1 is a side elevation view with parts broken away of an electric motor driven, fuel metering pump incorporating the flowmeter of the present invention;

FIG. 2 is an enlarged side elevational view of a flowmeter in accordance with the invention;

FIGS. 3 and 4 are end views taken in the directions 3—3 and 4—4, respectively, of FIG. 2;

FIG. 5 is a cross-sectional view taken in the plane 5—5 of FIG. 3 of the flowmeter housing with the rotor assembly and photoelectric transducer assembly removed;

FIG. 6 is a further enlarged sectional view with parts broken away taken in the direction 6—6 of FIG. 3.

FIG. 9 is a side elevation view of an integral mounting for the components of the photoelectric transducer employed with the flowmeters herein;

DESCRIPTION

Figure 7:
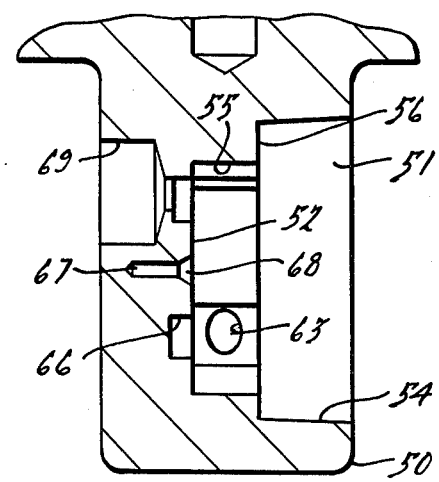
FIG. 7 is a view similar to FIG. 6 of a part of the flowmeter housing.

Referring to the drawings, FIG. 1 illustrates to approximate scale an electric motor driven fuel pump 20 designed for use in the fuel metering system of the aforementioned U.S. Pat. No. 4,048,964 to deliver a scheduled quantum of fuel whose mass flow rate is continuously monitored by the flowmeter 40 of the present invention.

The pump 20, which is of the slipper variety, delivers fuel to the engine (not shown) at a relatively high pressure, say, 60 psi at maximum flow rates for example, and has a cover or end housing 22 into which fuel is admitted to an inlet 23 and which contains an outlet passage 24 communicating with a bored cylindrical outlet chamber 25. The subject flowmeter 40 is received within the open end of the bored chamber, abutting against the end wall 26 thereof, and has an annular grooved header or plug stopper portion 42 at the other end thereof which carries an O-ring 44 in the annular rim 43 thereof and is of a diameter as to effectively seal the open end of the pump outlet chamber.

Fuel flows outwardly through a plurality of exhaust ports, which are formed in the sides of the flowmeter and are more fully described hereinafter, in the directions indicated into the outlet chamber 25 in the pump end housing or cover from which it exhausts through pump outlet passages 28 and 29. Removably attached to the header 42 at the outer end of the meter housing is a flanged, rectangular plastic housing 100, which is releasably fastened to the pump cover and contains the electronic circuitry for the photo-optical transducer system associated with the flowmeter.

With reference to the flowmeter embodiment shown in FIGS. 2-9 of the drawings, the flowmeter 40 includes a one-piece headed T-shape, die-cast zinc housing 41, which is formed with the aforementioned cylindrical header 42 at one end thereof and a short, longitudinally extending block-shaped body portion 50, which is of a rectangular cross-section and stems or projects normally from the back face of the header. Formed in the body portion 50 is a cylindrical cavity 51, which opens to and is accessible from one side of the body portion and extends therein a depth or distance to the bottom or side wall 52 of the cavity that is slightly more than one-half the thickness or width of the body portion with reference to the orientation of the meter shown in FIG. 3.

As shown in FIGS. 5, 6 and 7, the cavity is of stepped formation with an inwardly tapering circumferential wall 54 surrounding a diametrically reduced, inner circumferential wall 55, which is joined to the wall 54 by a circumferential land portion 56. Cast in the land portion is a plurality of arcuate or scallop-shaped, broad or flat-tipped braking teeth 57 formed by substantially uniformly spaced, inwardly extending arcuate pockets 58 of a depth or radius approximately one-third the radius of the cavity.

Closing the opening and seating against the escalloped peripheral or circumferential land 56 in the cavity is a one-piece, die-cast, stepped cover 70 having a plurality of openings therein and an integrally formed, radially extending alignment tab 71, which is received in a complimentary depression in the cavity opening side of the meter body portion. An O-ring 72, carried on the diametrically reduced portion 74 of the stepped cover, centrally aligns and seals the cover against the body portion to which it is removably fastened by threaded screws 73.

Fluid is admitted to the narrow fluid chamber 60, which is provided between the inner face of the cover 70 and the bottom side wall 52 and the reduced cylindrical portion 55 of the cavity in the body portion, through an inlet passage 61, which is formed in the lower section and in the longitudinal axial central plane of the body portion. The inlet orifice has a flared or bell-shaped inlet opening 62 at the outer end of the meter housing, which abuts against the end wall 26 of the bored cylindrical chamber 25 in the pump cover 22 and is sealed thereagainst by an O-ring sealing element 30 surrounding the pump outlet passage 24, as shown in FIG. 1. At its outer end, the flared inlet opening 62 has a diameter approximately three times that of the inlet passage 61, which extends longitudinally of the body portion 50 and intercepts the peripheral circumferential wall 55 of the fluid chamber 60 tangentially of and in the southwest quadrant of the cavity, as shown in FIG. 5. The flared inlet provides a smooth transition to the fluid flow from the passage 24 to the tangential inlet orifice, which is of a reduced diameter, and minimizes any tendency to the production of turbulence.

Cast in the lower portion of the housing body 50 and colinear to the longitudinal axis of the tangential inlet passage 61 is a tangential outlet passage 63, which is in this configuration, of substantially the same diameter as the inlet passage. Outlet passage 63 extends longitudinally through the housing body portion 50 and a concavity 45 in the header 42, which receives a sealing plug 46 cemented in the cavity for blocking the end of the outlet passage remote from the fluid chamber 60. The tangential outlet passage 63 communicates with a generally boot or shoe-shaped slot 64, which is cast in and extends the width or transversely through the body portion, to exhaust fluid from the tangential outlet passage 63 through both sides of the body portion into the cylindrical outlet chamber 25 in the pump cover or end housing.

In addition to the outlet passage 63, which exhausts fluid tangentially of the fluid chamber 60, fluid is also exhausted generally axially of the fluid chamber through outlet openings formed in and extending through the side wall 52 of the cavity 51 and axially of the cover 70. In the embodiment illustrated in FIGS. 2-9, the axial exhausts are formed by a series of six equally spaced holes 65, each measuring approximately 0.030 inch in diameter. The holes 65 are distributed along a substantially semicircular arc, which is located above the tangential inlet and outlet passages at a radial distance from the geometrical axial center of the fluid chamber approximately two-thirds of the radius of the chamber and is oriented to include the northwest and part of the northeast and the southwest quadrants of the cavity 51. An axial exhaust provided by a similar set of holes 75, which are axially aligned with the outlet holes 65 in the side wall 52 of the cavity, is provided in the cover 70.

Located radially inwardly of the axial exhaust outlet holes in the cavity side wall 52 and in the cover 70 is an integrally formed, centrally located hub 66, 76, formed on the inner face of the cavity side wall and on the cover respectively. Each of the hubs has a bored aperture 67, 77 extending partly therethrough as shown in FIGS. 6 and 7 for receiving one end of a solid uniform section pin or spindle 81, which has a close, but loose and not necessarily a press, fit therein and on which is mounted the rotor element 80. At their outermost ends at the surface of the cavity end wall 52 and inner face of the cover, the apertures 67, 77 are countersunk as shown at 68 (FIG. 7) to form conical guides, which aid in centering and positioning the spindle when the cover 70 is assembled to the housing 41 with the spindle and rotor assembly in place therein.

Figure 8:
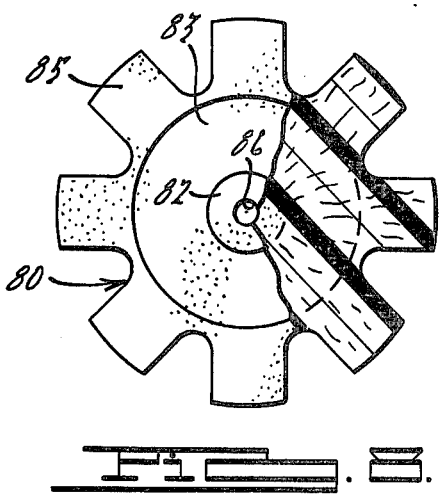
FIG. 8 is a side elevation view of the rotor of FIG. 7.

Rotor 80 is molded in one piece of a light weight material, which is inert to the fluid (gasolene) passing through the flowmeter and has a specific gravity slightly greater than, but ideally approaching that of the fluid. Structurally, it includes the aforesaid axial hub 82, a thin circular web portion 83 and a thicker rim portion, around the periphery of which are distributed eight equally spaced teeth 85, which are of uniform, substantially equal width and depth and of an axial thickness slightly less than that of the rotor hub 82, as shown in FIG. 8.

Spindle 81 is constructed of a material inert to the metered fluid, as non-corrosive stainless steel nickel alloy music wire, of a diameter of a few thousandths of an inch, 0.0015 for example, smaller than that of the diameter of the closely fitting rotor hub 82, the central bore of which has a die smooth internal finish. The rotor wheel is thus freely rotatable on or relative to the spindle, which provides a fine line contact engagement with and along the full axial width of the low friction coefficient rotor hub. Nylon, impregnated with Teflon fibers, has been found to satisfy the above enumerated requirements for the composition of the rotor wheel providing a light weight, low mass and inertia, chemically inert, dimensionally stable structure, although other plastic combinations suitable to the application, could be found. Its unitary journal and mounting arrangement on the relatively fixed or non-rotating spindle provides a low friction mount, comparable to that provided by costlier jeweled journals. Ball race bearings employed in prior forms were obviated due to their added inertia, extra cost and additional assembly procedures. The side faces of the rotor wheel may be sand blasted or otherwise roughened or treated to provide a matte, flocked, stippled, pimpled or dimpled surface finish thereon, which has been found to yield some improvement in the cogging effect between the rotor and the viscosity of the fluid, thereby improving the linearity characteristic of the meter.

The rotation of the rotor is sensed by the photoelectric transducer assembly 90 comprising a photo-diode 91 and a phototransistor 92, which are supported in a generally U-shaped, unitary mounting 93 molded in one-piece of a plastic insulator material, as Nylon for example, chemically inert to the metered fluid. Mounting 93 encircles the flowmeter housing on three sides, i.e., the bottom and both sides, as shown in FIG. 3 and has a pair of laterally-spaced, integrally formed arms 94 extending normally from its front face. Each arm 94 has a split, inwardly-directed, apertured protuberance or projection 95, which receives one of the photodiode 91 and phototransistor 92 elements as shown in FIG. 6, and is press-fitted snugly in place into a countersunk aperture 69, 79 provided in the cavity sidewall 52 and cover 70, as shown. The apertures 69, 79 are positioned, and are of such dimension at their reduced innermost ends, so that the radiant energy beam from the photodiode 91 and incident upon the phototransistor 92 will be in the path of and will be intercepted by the rotation of the rotor 80. Thus, the width of the rotor teeth should be greater than the diameter of the reduced inner ends of the countersunk apertures 69, 79 and the width of the radiant energy beam so that the latter will be completely occluded and periodically interrupted by the passage of the rotor teeth thereby.

The electrical leads from the photodiode and phototransistor elements extend outwardly of the mounting projections 95 and are soldered to the split or tined ends of a respective one of four electrically conductive connector pins 96 formed of brass material. Connector pins 96 are received in four longitudinally extending protuberances 97, which are integrally formed on the plastic mounting 93 and are received in and extend through a different and corresponding one of four similarly spaced, rectangularly arrayed, axially extending openings 47 in the header 42. Each pin 96 has an enlarged short cylindrical section 98 approximately midway of its length just beyond the point where it exits from the front face of the header 42 and carries an O-ring 99 positioned between the cylindrical section 98 and the front face of the header 42 to seal the opening 47 in which it is carried in the header. The outer ends of the connector pins 96 pass through the outer wall into the interior of the aforementioned plastic housing 100, which forms an electrical plug-type attachment and connector with the connector pins and is detachably mechanically fastened to the header 42 by a threaded stud (not shown), received in a threaded opening 48 located centrally of the header.

Figure 10:
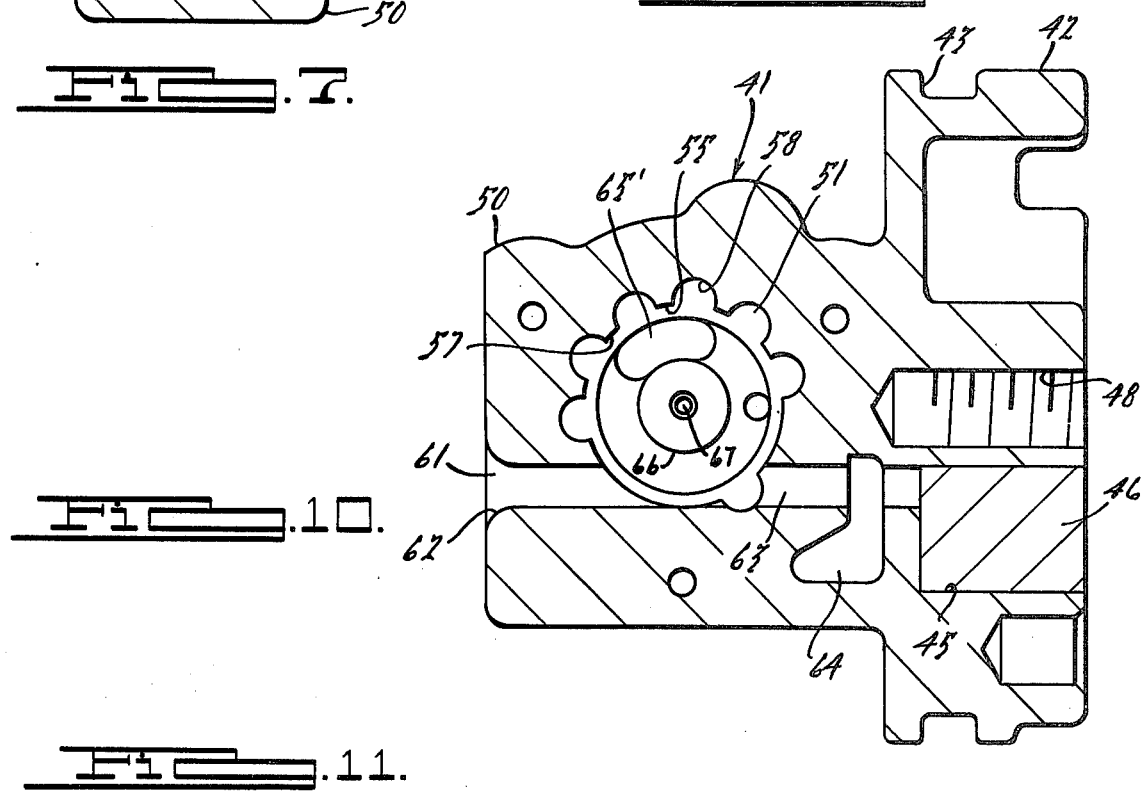
FIG. 10 is an enlarged side elevational view of a flowmeter housing in accordance with another embodiment of the invention.

FIG. 10 illustrates another embodiment of a flowmeter, which is generally similar to that described and shown in FIGS. 2–9 herein, except for the configuration of the axial exhausts, which have been opened up and enlarged to improve the linearity of the flowmeter. In FIG. 10, the axial exhaust outlets are formed as arcuate, slot-shaped openings 65' and 75' in the cavity side wall 52 and cover 70, the longitudinal arcuate axis of the slots being displaced radially from the center of the cavity by a distance approximately two-thirds of the radius of the chamber 60 or one-half of the radius of the stepped cavity 51. With reference to the vertical orientation of the flowmeter, the slots are located in a region past the tangential outlet port 63 in the direction of rotation of the fluid around the cavity or in the third and fourth or northeast and northwest quadrants thereof.

In a preferred form of the flowmeter exhibiting low drift, excellent linearity and optimum repeatability characteristics, the slot spans an arc of approximately 96 degrees or slightly greater than one quadrant of arcuate length or extent and has a width, taken in a radial direction, of approximately 0.067 inch, with tangential inlet and tangential outlet orifice diameters of 0.067 inch and 0.070 inch, respectively. A 0.067 inch slot of an arc length of 123 degrees has also been employed with tangential inlet and outlet orifice diameters of 0.063 and 0.067 inch, respectively.

From the foregoing dimensions it can be seen that the flowmeters described herein are of extremely compact size and miniature construction. The inner diameter of the stepped cavity 51 in the flowmeter housing measures 0.500 inch and the fluid chamber 60, which is of a width of 0.094 inch, encloses a minimum volume of fluid therein. Thus, the rotating volume of fluid within the chamber 60 will be of minimum mass and inertia so that the flowmeter will accurately and rapidly respond to changes in the fluid flow therethrough. The elevation and location of the rotational axis of the rotor wheel relative to the tangential inlet orifice in the depicted orientation of the flowmeter provides buoyant support to the rotor by incoming fluid. The above factors taken in further conjunction with the low friction mounting of the light weight, low mass miniature rotor wheel 80 in the fluid chamber and the braking teeth 57 provided in the peripheral circumferential wall 55 of the chamber contribute to the fast response and rapid braking characteristics of the subject flowmeters.

Figure 11:
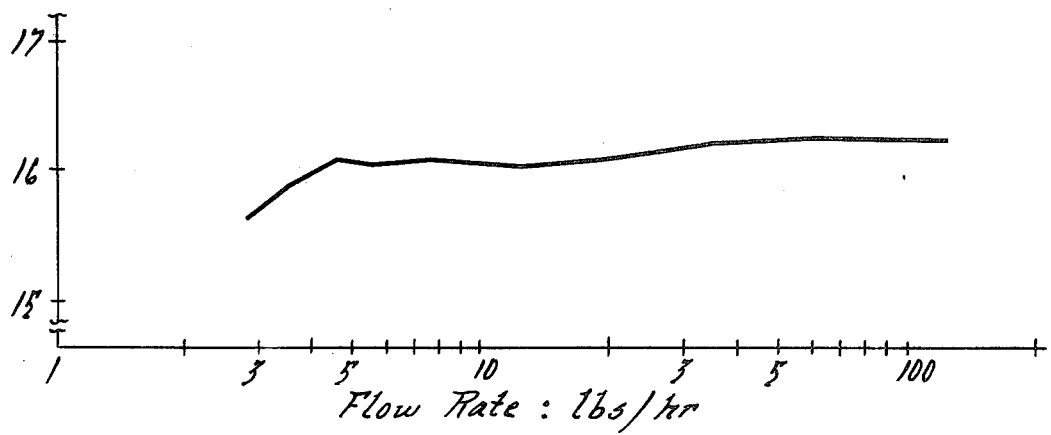
FIG. 11 is a characteristic curve of a flowmeter utilizing the principles of the present invention.

FIG. 11 is a semi-logarithmic plot of the linearity characteristic of the flowmeter of FIG. 10 and represents the slope of the flowmeter calibration curve (not shown) over the range of fuel flow rates encountered in the operation of the engine fuel metering system in which the flowmeter is employed. The flowmeter calibration curve would be plotted in terms pulses per second as ordinate and flow rate in pounds/hour as abscissa and ideally should be a linear function, $y=kX$, starting from zero and increasing linearly and uniformly at a constant rate which would therefore yield a straight, flat horizontal line for the ideal linearity characteristic when plotting slope versus flow rate.

Over the range of fuel rates of from 4 pounds/hour to 110.2 pounds/hour required for an 8 cylinder engine, it can be seen that the flowmeter exhibits excellent linearity with a deviation of no more than ±0.2 out of 16 ordinate units yielding a linearity of within ±1¼%.

The slope ordinate of the linearity characteristic of FIG. 11 is related to the pulse count/second of the flowmeter, the described forms of which provides a relatively high pulse count of 15.5 pulses per second at a flow rate of 1 pound/hour or 155 pulses per second at 10 pounds/hour and 1550-pulses per second at 100 pounds/hour. The pressure drop or differential between the inlet and outlet of the flowmeter is in the order of 4½ psi at a flow rate of 100 pounds/hour and is therefore well within the control pump capabilities.

The above-mentioned characteristics of the flowmeter are attributed to its unique size and design predicated on the desirable properties of tangential exhaust and axial exhaust-type flowmeters which have been judiciously combined to provide a composite flowmeter of improved linearity and performance. Constructionwise, the major portion of the flowmeter consists of four parts, excluding the three cover retaining screws and O-rings, while the complete photoelectric transducer and connector assembly adds only seven more parts, four of which are connector pins, to the entire flowmeter. The connector pins, cover retaining screws and plastic housing retaining stud are the only machined parts of the flowmeter, which, as stated, is composed of a minimum number of parts and is of inexpensive and simple construction. The flowmeter housing and its cover are each unitary die-cast elements with the housing formed in a split mold with multiple draw slides and pins to form the various passages and pocketed cavity therein.

What is claimed is:

1. A composite tangential exhaust and axial exhaust fluid flowmeter comprising, in combination,
   housing means having
   a substantially cylindrical cavity for receiving a rotor element therein,
   a common fluid inlet port means in direct communication with said cylindrical rotor cavity and directing all of the fluid entering the flowmeter into said rotor receiving cavity,
   a plurality of fluid exhaust outlet port means each coupled in series fluidic relation with said fluid inlet port means and in parallel fluid relation to each other, one of said fluid exhaust outlet port means extending generally longitudinally of said housing means and formed generally tangentially of said cavity to exhaust fluid tangentially therefrom and another of said fluid exahust outlet port means extending transversely of said housing means and formed parallel to the central axis of said cavity to exahust fluid in a direction axially transversely of said cavity, and a rotor element rotatable in the cavity by all of the fluid entering said housing through said inlet port means and exhausting from said cavity through any of said fluid exhaust outlet port means communicating with said rotor receiving cavity.

2. A composite tangential and axial exhaust flowmeter in accordance with claim 1 above wherein said fluid inlet port means extends generally longitudinally of said housing means and is formed generally tangentially of said cavity to admit fluid tangentially thereof.

3. A composite tangential and axial exhaust flowmeter in accordance with claim 2 above having a plurality of axial exhaust outlet port means therein.

4. A composite tangential and axial exhaust flowmeter in accordance with claim 3 above wherein said axial exhaust outlet port means are balanced to exhaust fluid in opposite axial directions of said cavity in said housing means.

5. A composite tangential and axial exhaust flowmeter in accordance with claim 2 above wherein the total area of the several fluid exhaust outlet port means is greater than the area of the tangential inlet port means.

6. A composite tangential and axial exhaust flowmeter in accordance with claim 2 above wherein the area of the axial exhaust outlet port means is greater than the area of the tangential exhaust outlet port means.

7. A composite tangential and axial exhaust flowmeter in accordance with claim 2 above wherein the area of the axial exhaust outlet port means is greater than the area of the tangential inlet port means.

8. A composite tangential and axial exhaust flowmeter in accordance with claim 2 above wherein the longitudinal axes of the tangentially formed inlet port means and tangentially formed outlet port means are substantially collinear.

9. A composite tangential and axial exhaust flowmeter in accordance with claim 8 above wherein said tangentially formed inlet port means and outlet port means communicate with the interior of said housing means in adjacent quadrants of said cylindrical cavity.

10. A composite tangential and axial exhaust flowmeter in accordance with claim 9 above wherein said quadrants are the lower or southwest and the southeast quadrants of said cavity.

11. A composite tangential and axial exhaust flowmeter in accordance with claim 10 above wherein said rotor element is mounted for rotation on the geometrical central axis of said cavity located between and above said tangentially formed inlet and outlet port means, whereby the rotor element will be buoyantly supported when fluid is admitted into said cavity.

12. A composite tangential and axial exhaust flowmeter in accordance with claim 2 above wherein said tangentially formed inlet port means is of a flared, bell-shape at its entrance to the housing means.

13. A composite tangential and axial exhaust flowmeter in accordance with claim 12 above wherein the radius of the flared bell-shaped opening in said inlet port means is approximately equal to the diameter of said inlet port means.

14. A composite tangential and axial exhaust flowmeter in accordance with claim 13 above wherein the diameter of the flared bell-shaped opening in said inlet port means is approximately three times the diameter of said inlet port means.

15. A composite tangential and axial exhaust flowmeter in accordance with claim 3 above wherein the axial exhaust outlet port means are radially displaced from the center axis of the cavity and are contained mainly in the upper or northwest and northeast quadrants thereof.

16. A composite tangential and axial exhaust flowmeter in accordance with claim 1 above wherein said axial exhaust outlet port means comprises a plurality of uniformly spaced apertures in said housing means.

17. A composite tangential and axial exhaust flowmeter in accordance with claim 16 wherein said axial exhaust apertures are located at a radius approximately half that of the cylindrical cavity.

18. A composite tangential and axial exhaust flowmeter in accordance with claim 17 above wherein said axial exhaust apertures are located in the northwest and part of the northeast and southwest quadrants of said cylindrical cavity.

19. A composite tangential and axial exhaust flowmeter in accordance with claim 1 above including a cover means for enclosing the cavity with the rotor element therein and having outlet means.

20. A composite tangential and axial exhaust flowmeter in accordance with claim 19 above wherein said axial exhaust outlet port means in said cover means conforms in shape to and aligns with the axial exhaust outlet port means in said housing means.

21. A composite tangential and axial exhaust flowmeter in accordance with claim 20 above wherein said cover means includes alignment means thereon for alignment of said axial exhaust outlet port means therein with the axial exhaust outlet port means in said housing means.

22. A composite tangential and axial exhaust flowmeter in accordance with claim 21 above wherein said alignment means includes a radially extending tab on said cover means received in a complementary shaped opening in said housing means.

23. A composite tangential and axial exhaust flowmeter in accordance with claim 22 above wherein said alignment means includes an O-ring located circumferentially on the said cover to provide a means for centering said cover means in said housing means.

24. A composite tangential and axial exhaust flowmeter in accordance with claim 23 above wherein said O-ring means provides a sealing means to prevent fluid from escaping from the interface between the said cover means and the said housing means.

25. A composite tangential and axial exhaust flowmeter in accordance with claim 1 above wherein said cylindrical cavity is of minimum volumetric capacity relative to the volume of the rotor so that the volume of fluid enclosed thereby will present low fluid mass and inertia to the rotation of the rotor and wherein said cavity has a plurality of braking teeth formed in a peripheral circumferential wall thereof to provide a rapid coastdown characteristic to the rotor.

26. A composite tangential and axial exhaust flowmeter in accordance with claim 25 above wherein said circumferential wall of said cavity has a plurality of uniformly and arcuately spaced, arcuate pockets therein to impart an escalloped, broad flat-tipped shape to said braking teeth.

27. A composite tangential and axial exhaust flowmeter in accordance with claim 26 above wherein said scallop-shaped braking teeth have a depth of approximately one-third the radius of said cylindrical cavity.

28. A composite tangential and axial exhaust flowmeter in accordance with claim 1 above wherein said rotor element has a matte finish on the side faces thereof.

* * * * *